April 28, 1953 — H. E. STOUT — 2,636,245
CUTTING DEVICE
Filed Jan. 4, 1951 — 2 SHEETS—SHEET 1
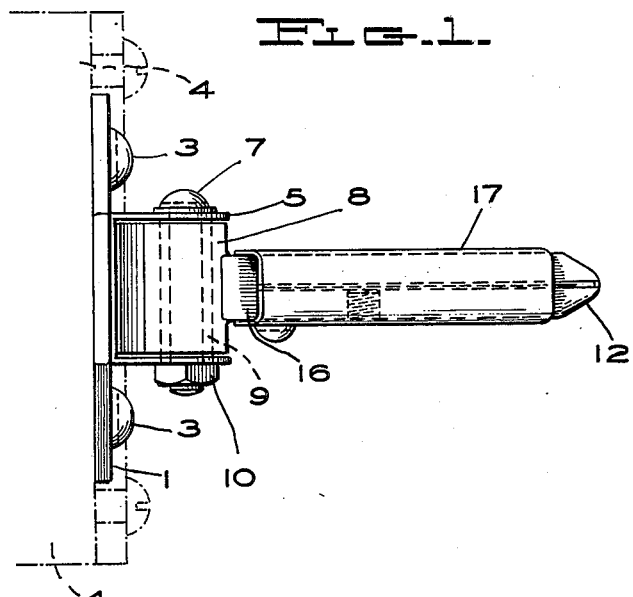
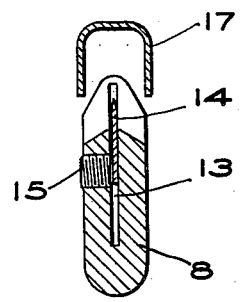
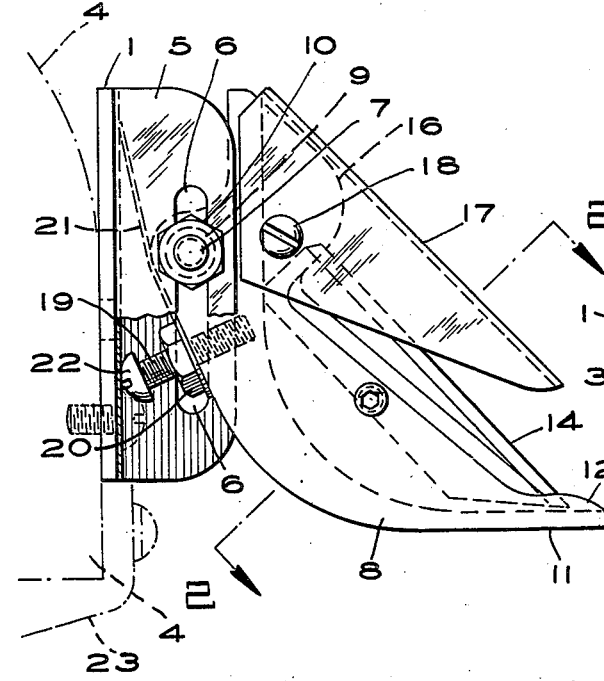
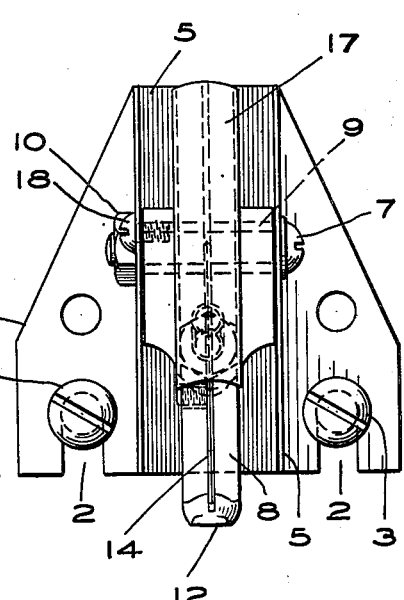
Inventor
HAROLD E. STOUT
Attorney

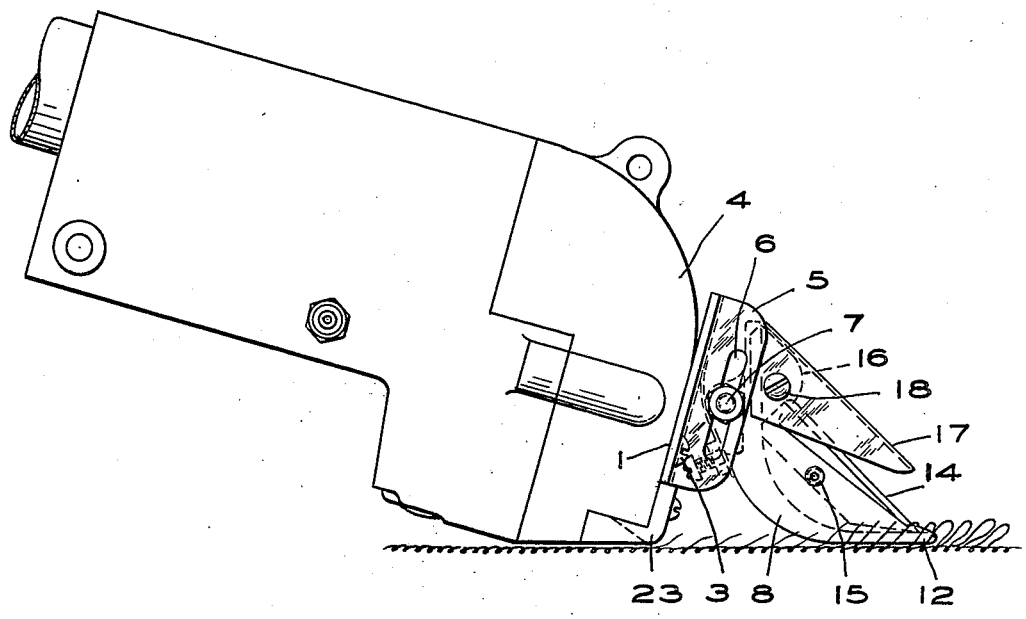
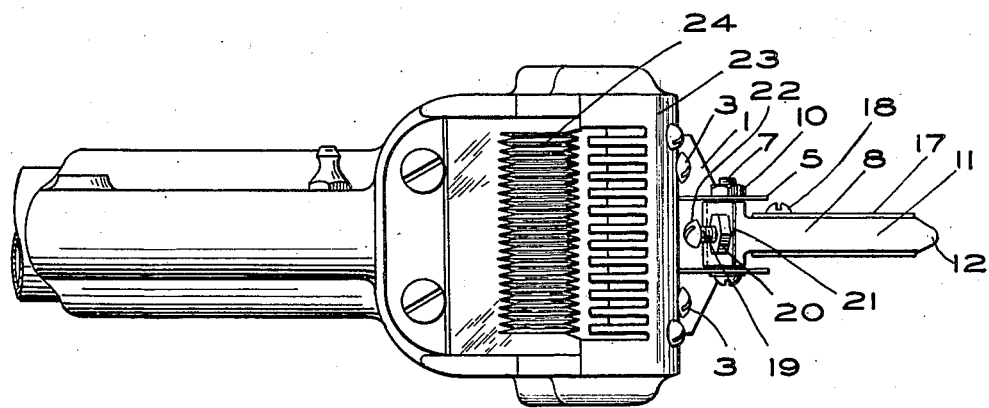

Patented Apr. 28, 1953

2,636,245

UNITED STATES PATENT OFFICE 2,636,245

CUTTING DEVICE

Harold Edgar Stout, West Leesport, Pa., assignor to Textile Trimming & Boarding Machine Company, Reading, Pa., a corporation of Pennsylvania Application January 4, 1951, Serial No. 204,334

11 Claims. (Cl. 26—11)

This invention relates to thread trimming machines and especially to a cutting device which cooperates with the trimming mechanism and engages the loops formed by threads and cuts them open to permit the separated ends of the threads to be trimmed by the trimming mechanism.

One object of this invention is to provide a new and improved cutting device of the indicated type.

Another object is to provide a cutting device which can be readily mounted on the trimming machine for easy manipulation therewith.

Another object is to provide a cutting device which can be readily adjusted on the trimming machine relative to its trimming mechanism.

A further object is to provide a cutting device which automatically adjusts itself to any operating position of the trimming machine.

Still another object is to provide a cutting device which can be adjusted to cut open both small and large loops of threads.

A still further object is to provide a cutting device which is constructed so as to readily engage and enter the loops of threads for severance of the threads forming the loops.

Another object is to provide the cutting device with a cutting blade holder in which the cutting blade is replaceably mounted therein.

Still another object is to so construct the blade holder of the cutting device that it provides pilot or guide means ahead of the cutting blade for engaging and arranging the loops of threads in advance of the cutting operation.

With these and other objects in view which will become more readily apparent from the following detailed description of a practical and illustrative embodiment of my improvement shown in the accompanying drawings, my invention comprises the novel cutting device, elements, features of construction and arrangements of parts in cooperative relationship, as more particularly defined and indicated by the hereto appended claims.

In the accompanying drawings:

Figure 1 is an enlarged top plan view of the cutting device.

Figure 2 is a cross sectional view of the cutting device, the section being taken as indicated by the arrows 2—2 in Figure 3.

Figure 3 is an enlarged side elevational view of the cutting device.

Figure 4 is an enlarged front elevational view of the cutting device.

Figure 5 is a side elevational view of a trimming machine equipped with the novel cutting device.

Figure 6 is a bottom plan view of the trimming machine and cutting device illustrated in Figure 1.

It will be helpful to an understanding of my invention to first briefly consider some of the more important aspects and features thereof, so that these may be kept in mind during the subsequent reading of the detailed description of the practical and illustrative embodiment shown in the accompanying drawings. Accordingly, it is noted that my invention is adapted to be adjustably mounted to the front of a thread trimming machine so as to make such a machine capable of trimming looped threads by first opening and aligning the loops and then cutting them open to cause the freed ends of the threads to properly enter the nose piece of the trimming machine and thus effect efficient trimming by the trimming mechanism. The cutting device is provided with a combined blade holder and pilot member which in the operation of the trimming machine is directed to engage into and align the looped threads and then guide them over the cutting blade. The cutting blade preferably comprises a single edged razor blade which is held and clamped in its holder so as to extend angularly upward from the pilot at the front of the blade holder and cause the closed ends of the loops to move against the inclined cutting edge of the blade to be severed thereby on contact therewith.

An inverted troughlike guard is angularly mounted and adjustable on the blade holder so as to overhang a variable portion thereof. This guard member engages the ends of any loops that have not been cut open by the blade by the time such loops reach the guard member. Movement of the cutting device with the trimming machine thus causes the guard member to force the end of such loops against the cutting edge of the blade and effect severance thereby.

The blade holder of the cutting device is swingably mounted on the trimming machine and is yieldingly held in a predetermined position by means of an adjustable stop. This permits the adjustment of the cutting blade to a predetermined starting position in front of the trimming machine from which it can adjust itself to any other angular position relative to the nose piece and trimming mechanism that will insure efficient engagement of the looped threads and severance in a manner that will thereafter cause proper trimming of the free ends of the threads by the trimming mechanism.

Referring now more particularly to the figures of the drawings, reference numeral 1 indicates the supporting member or anchoring flange with which the cutting device is mounted to the trimming machine. A pair of slots 2—2 are provided in this supporting member for suitable screws 3—3 to pass therethrough and adjustably clamp the supporting member to the nozzle housing 4 of the trimming machine. A vertically arranged channel 5 on the supporting member 1 is adapted to support the cutting device proper and permit initial vertical adjustment thereof. Both sides of the channel 5 are slotted as indicated at 6—6 to permit a clamping bolt 7 to pass through the sides of the channel 5 and the enlarged end of the blade holder 8 between them.

The blade holder 8 is provided with a combined bearing and spacing sleeve 9 for the bolt 7 to pass therethrough and provide a bearing for the blade holder to rock thereon. The sleeve 9 is slightly longer than the width of the blade holder and thus predeterminately spaces the sides of the channel 5 so that tightening of the clamping nut 10 on the bolt 7 causes the sides of the channel 5 to be drawn only against the ends of the sleeve. In this way the blade holder may be positioned in the channel within the range of the slots 6—6 without interfering with the rocking movement of the blade holder in the channel.

As illustrated in the figures, the blade holder proper is reduced in width in front of the channel 5 and the bottom curves downwardly and outwardly from the channel 5 and terminates in a straight guide section 11. The top of the blade holder inclines downwardly and forwardly of the channel 5 and terminates in a pilot member 12 at the outer free end of the holder. A slot 13 in the middle of the blade holder provides for the insertion of the blade 14 in such a manner that its cutting edge forms a continuation of the top surface of the pilot member 12. The blade is held in place in the slot 13 by means of the set screw 15 which is threaded into the side of the blade holder for engagement with the side of the blade as illustrated in Figure 2.

At the upper end of the blade holder is provided with a lug 16 for the support of the inverted channel guard 17. The sides of this guard embrace the lug 16 above the blade holder proper and a bolt 18 which passes through one side of the guard and is threaded into the lug serves as a combined clamping member and pivot for angular adjustment of the guard over the blade in the blade holder.

The bottom edges of both sides of the guard 17 are laterally spaced from the blade 14 and extend angularly thereto in a straight line so that any thread moving over the cutting edge of the blade will finally reach a point where these bottom edges force the thread against the cutting edge of the blade and as the result thereof cause the thread to be severed thereby. The guard may be angularly adjusted on the blade holder, in order to have its bottom edges spacedly cross the cutting edge of the blade at the desired elevation on the cutting blade for a purpose that will presently appear.

The back of the blade holder 8 carries the bolt 19 which has threaded thereon the clamping nut 20. The bolt passes through one end of the leaf spring 21 and the nut 20 is adapted to clamp this spring against the blade holder so as to have it project upwardly therefrom and make yielding contact with the channel 5. In this way the spring urges the blade holder to swing on the pivot bolt 7 toward the supporting member 1 while the bolt 19 with its head 22 restricts such a movement by its contact with the channel 5. The spacing of the head 22 by its bolt 19 from the back of the blade holder and its contact with the channel 5 thus determines the normal or starting position of the blade holder on the supporting member 1 from which it is moved against the pressure exerted by the spring 21 when the blade holder is brought into contact with the textile material from which looped threads are to be cut open while the trimming machine is held for efficient trimming of the resulting free ends of the threads as illustrated in Figure 5.

The top and sides of the pilot 12 taper toward the front and are rounded off at the end so that it has the shape of a pointed nose that can be readily directed and engaged into the looped threads that are to be opened by the cutting device. Behind the pilot 12 the blade holder is tapered toward the slot 13 and the cutting blade 14 mounted therein so that any threaded loop, after having passed over the pilot 12 and having been expanded thereby, will rest solely on the cutting edge of the cutting blade. Any closed end of a looped thread which is thus brought into contact with the cutting edge will then on further movement of the cutting device be severed by the cutting edge. Looped ends that are not opened directly behind the pilot because of their greater height will be cut whenever the ends thereof are contacted by the gradually increasing height of the inclined cutting edge as the blade holder is advanced until finally the last of such looped threads are forced into contact with the cutting edge by the sides of the guard 17 when further movement of such loops over the blade is arrested thereby.

For the purpose of initially adjusting the cutting device for either large or small loops of threads the guard 17 is adapted to be moved and set into varying angular positions over the cutting blade so as to provide its stop at a point over the cutting edge where it restricts the cutting operation to the desired effective length of the cutting blade. The top of the lug 16 is inclined substantially parallel to the top of the blade holder proper and in that way serves as a stop for engagement by the under side of the upper end of the guard to permit the guard to be raised only to a predetermined maximum raised position.

As will be seen from an inspection of Figure 5, the nose piece 23 of the trimming machine spacedly follows the cutting device and operates to arrange and position the freed ends of the threads for efficient and predetermined trimming by the trimming mechanism 24 as illustrated and described more in detail in my copending application Serial No. 158,745, filed April 28, 1950, which matured into Patent No. 2,607,101 on August 19, 1952.

While I have illustrated and described a practical and illustrative embodiment of my novel cutting device for use with trimming machines, it is to be understood that various changes and modifications thereof are possible without departing from the scope of my invention which is more particularly indicated by the hereto appended claims.

I claim:

1. In combination with a thread trimming machine having a nozzle and thread arranging and trimming means at the open end of said nozzle, of a cutting device mounted on said nozzle in front of said arranging and trimming means comprising a cutting blade and means for yieldingly mounting said blade to said nozzle for angular self adjusting movement relative to said nozzle in front of said thread arranging and trimming means.

2. In combination with a thread trimming machine having a nozzle and thread arranging and trimming means at the open end of said nozzle, of a cutting device mounted on said nozzle in front of said arranging and trimming means comprising a cutting blade, means for yieldingly mounting said blade to said nozzle for angular self adjusting movement relative to said nozzle in front of said thread arranging and trimming means, and a guard member movable with said cutting blade and extending angularly thereto.

3. In combination with a thread trimming machine having a nozzle, a laterally moving cutting blade and a nose piece in front of said cutting blade at the open end of said nozzle, of a cutting device mounted on said nozzle in front of said nose piece, and comprising a blade holder yieldingly mounted for angular adjusting movement in front of said nose piece, a pilot member at the free end of said blade holder, and a cutting blade held upwardly and rearwardly inclined by said blade holder in alignment with said pilot member.

4. In combination with a thread trimming machine having a nozzle, a cutting blade and a nose piece in front of said cutting blade at the open end of said nozzle, of a self adjusting cutting device mounted on said nozzle in front of said nose piece and comprising a blade holder yieldingly mounted for angular self adjustment in front of said nose piece relative to the angular position in which the nose piece is held by its operator, a pilot member at the front end of said blade holder, a cutting blade in said blade holder with its cutting edge in line with said pilot member, and a guard member carried by said blade holder and extending angularly to said cutting blade adjacent thereto.

5. In combination with a thread trimming machine having a nozzle, a cutting blade and a nose piece in front of said cutting blade at the open end of said nozzle, of a self-adjusting cutting device mounted on said nozzle in front of said nose piece and comprising a blade holder yieldingly mounted for angular self adjustment in front of said nose piece relative to the angular position in which the nose piece is held by its operator, a pilot member at the front end of said blade holder, a cutting blade in said blade holder with its cutting edge in line with said pilot member, and a guard member carried by said blade holder and extending angularly to said cutting blade on each side thereof.

6. A cutting device for attachment to a thread trimming machine comprising a mounting member adapted to be anchored to the trimming machine, a blade pivotally secured to said mounting member with one end thereof, means urging the other end of said blade into a predetermined angular position on said mounting member, and a guard movable with said blade angularly thereto.

7. A cutting device for attachment to a thread trimming machine comprising a mounting member adapted to be anchored to the trimming machine, a blade holder pivotally secured with one end on said mounting member, means urging the back of said blade holder toward said mounting member, stop means interposed between said mounting member and the back of said blade holder to limit the swinging movement of said blade holder toward said mounting member and to hold said blade holder in a predetermined angular position on said mounting member, and a cutting blade supported by said blade holder.

8. A cutting device for attachment to a thread trimming machine comprising a mounting member for attachment to the trimming machine, a blade holder pivotally mounted on said mounting member with one end thereof, means urging the free end of said blade holder toward said mounting member, adjustable stop means interposed between said mounting member and said blade holder to limit the movement of said blade holder toward said mounting member and effect variable angular positioning of said blade holder relative to said mounting member, and a cutting blade carried by said blade holder.

9. A cutting device for attachment to a thread trimming machine comprising a mounting member for attachment to the trimming machine, a blade holder pivotally mounted on said mounting member with one end thereof, means urging the free end of said blade holder toward said mounting member, adjustable stop means interposed between said mounting member and said blade holder to limit the movement of said blade holder toward said mounting member and effect variable angular positioning of said blade holder relative to said mounting member, a cutting blade carried by said blade holder, and an inverted trough shaped guard member mounted on said blade holder over said cutting blade for angular arrangement relative thereto.

10. A cutting device for attachment to a thread trimming machine comprising a mounting member for attachment to the trimming machine, a blade holder pivotally mounted on said mounting member with one end thereof, means urging the free end of said blade holder toward said mounting member, adjustable stop means interposed between said mounting member and said blade holder to limit the movement of said blade holder toward said mounting member and effect variable angular positioning of said blade holder relative to said mounting member, a cutting blade carried by said blade holder, an adjustable guard carried by said blade holder over said cutting blade, and means provided on said blade holder for engagement by said guard member for limiting the movement of said guard member in one direction.

11. A cutting device for attachment to a thread trimming machine comprising a mounting member adapted to be anchored to the trimming machine, a supporting member on said mounting member, a cutting blade, means for adjustably and swingably supporting said cutting blade on said supporting member, means for normally urging the swinging movement of said blade toward said supporting member, and stop means interposed between said supporting member and said blade for limiting the swinging movement of said blade in one direction.

HAROLD EDGAR STOUT.

References Cited in the file of this patent

UNITED STATES PATENTS

| Number | Name | Date |
|---|---|---|
| 387,359 | Kampfe | Aug. 7, 1888 |
| 512,125 | Scharff | Jan. 2, 1894 |
| 650,337 | Nicholls | May 22, 1900 |
| 1,002,415 | Marble | Sept. 5, 1911 |
| 1,752,611 | Naumann | Apr. 1, 1930 |
| 2,113,112 | Kitzmiller | Apr. 5, 1938 |